(12) United States Patent
Elgersma et al.

(10) Patent No.: US 10,311,752 B2
(45) Date of Patent: Jun. 4, 2019

(54) COMPRESSED EDGE MAP REPRESENTATION FOR IMAGE AIDED NAVIGATION

(71) Applicant: Honeywell International Inc., Morris Plains, NJ (US)

(72) Inventors: Michael Ray Elgersma, Plymouth, MN (US); Benjamin Mohr, St. Louis Park, MN (US)

(73) Assignee: Honeywell International Inc., Morris Plains, NJ (US)

( * ) Notice: Subject to any disclaimer, the term of this patent is extended or adjusted under 35 U.S.C. 154(b) by 176 days.

(21) Appl. No.: 15/424,188

(22) Filed: Feb. 3, 2017

(65) Prior Publication Data

US 2018/0225989 A1     Aug. 9, 2018

(51) Int. Cl.
| | |
|---|---|
| *G06K 9/48* | (2006.01) |
| *G09B 23/04* | (2006.01) |
| *G06F 16/50* | (2019.01) |
| *G06T 17/00* | (2006.01) |
| *G01C 21/00* | (2006.01) |
| *G06F 17/30* | (2006.01) |
| *G06T 9/20* | (2006.01) |
| *G06F 16/29* | (2019.01) |
| *G06T 7/13* | (2017.01) |

(52) U.S. Cl.
CPC ............ *G09B 23/04* (2013.01); *G01C 21/00* (2013.01); *G06F 16/50* (2019.01); *G06F 17/30244* (2013.01); *G06T 9/20* (2013.01); *G06T 17/00* (2013.01); *G06F 16/29* (2019.01); *G06F 17/30241* (2013.01); *G06T 7/13* (2017.01)

(58) Field of Classification Search
None
See application file for complete search history.

(56) References Cited

U.S. PATENT DOCUMENTS

| | | | |
|---|---|---|---|
| 6,891,975 B2 | 5/2005 | Okada | |
| 7,084,882 B1* | 8/2006 | Dorum | G01C 21/32 345/589 |
| 7,860,269 B2 | 12/2010 | Gal et al. | |
| 8,766,975 B2* | 7/2014 | Mohr | G01C 11/00 345/418 |
| 8,823,732 B2 | 9/2014 | Adams et al. | |

(Continued)

FOREIGN PATENT DOCUMENTS

CN        103206957 A    *   7/2013

OTHER PUBLICATIONS

Lane detection using B-Snake, Yue Wang et al., Elsevier, 0262-8856, 2004, pp. 269-280 (Year: 2004).*

(Continued)

*Primary Examiner* — Jayesh A Patel
(74) *Attorney, Agent, or Firm* — Fogg & Powers LLC

(57) ABSTRACT

A method of generating a map for image aided navigation comprises detecting one or more edges in one or more terrain images, and obtaining a compressed edge representation of the one or more edges. The compressed edge representation is obtained by a method comprising fitting a geometric form or other mathematical model to the one or more edges, calculating one or more coefficients based on the fitted geometric form or other mathematical model, and storing the one or more coefficients in a database for use in generating the map for image aided navigation.

14 Claims, 7 Drawing Sheets

(56) References Cited

U.S. PATENT DOCUMENTS

| | | | |
|---|---|---|---|
| 2007/0014488 A1* | 1/2007 | Chen | G06K 9/0063 382/294 |
| 2011/0087425 A1* | 4/2011 | Deng | G01C 21/32 701/532 |
| 2012/0139325 A1* | 6/2012 | Norberg | E21C 41/26 299/10 |
| 2012/0169847 A1* | 7/2012 | Lee | G06T 19/20 348/46 |
| 2016/0042251 A1* | 2/2016 | Cordova-Diba | G06T 5/00 382/180 |

OTHER PUBLICATIONS

Samadzadegan et al., "Position Estimation of Aerial Vehicle Based on a Vision Aided Navigation System", Joint Workshop Visualization and Exploration of Geospatial Data, Jun. 27, 2007, pp. 1-6.

European Patent Office, "Extended European Search Report from EP Application No. 17202930.8 dated Jun. 8, 2018", From Foreign Counterpart of U.S. Appl. No. 15/424,188, dated Jun. 8, 2018, pp. 1-8, Published: EP.

Keren, et al., "Describing Complicated Objects by Implicit Polynomials", IEEE Transactions on Pattern Analysis and Machine Intelligence, Jan. 1994, vol. 16, No. 1, IEEE.

Lei, et al., "3L Fitting of Higher Degree Implicit Polynomials", Division of Engineering, Brown University, 1996, pp. 1-6, IEEE, Providence, RI.

Anuta, "Spatial Registration of Multispectral and Multitemporal Digital Imagery Using Fast Fourier Transform Techniques", Transactions on Geoscience Electronics, Oct. 1970, pp. 353-368, vol. GE-8, No. 4, Publisher: IEE.

August et al., "The Curve Indicator Random Field: Curve Organization Via Edge Correlation", Kluwer Academic Publishers, 2000, pp. 265-288.

Berardi et al., "A Real-Time GPS-Challenged Navigation and Image Geo-registration System for Airborne Platforms", Apr. 20, 2015, pp. 687-693, Publisher: ION.

Cai et al., "Novel image registration method using edge correlation", Optical Engineering, Jan. 2010, pp. 1-7, vol. 49(1), Publisher: SPIE.

Canny, "A Computational Approach to Edge Detection", Transactions on Pattern Analysis and Machine Intelligence, Nov. 1986, pp. 679-698, vol. 8, No. 6, Publisher: IEEE.

Carr et al., "Digital scene matching area correlator (DSMAC)", Proceedings of the Society of Photo-Optical Instrumentation Engineers, 1980, pp. 36-41, vol. 238, Publisher: Image Processing for Missile Guidance, Published in: San Diego, CA.

Diel et al., "Epipolar Constraints for Vision-Aided Inertial Navigation", Proceedings of the IEEE Workshop on Motion and Video Computing (WACV/Motion'05), 2005, pp. 221-228, vol. 2, Publisher: IEEE.

Horev et al., "Detection of Long Edges on a Computational Budget: A Sublinear Approach", Siam J. Imaging Sciences, Feb. 26, 2015, pp. 458-483, vol. 8, No. 1, Publisher: 2015 Society for Industrial and Applied Mathematics.

Lipi et al., "A Multi-Sensor Image Registration Approach based on Long-Edge-Correlation", 2010, pp. 34-38, Publisher: IEEE, Published in: Beijing, China.

McKitterick et al., "Navigation-aiding using a 94GHz Radar for Helicopter Operations", pp. 1-7, Publisher: Honeywell Aerospace Advanced Technology.

Mourikis et al., "Vision-Aided inertial navigation for Spacecraft Entry, Descent, and Landing", IEEE Transactions of Robotics, Apr. 2009, pp. 264-280, vol. 25, No. 2.

Nerurkar et al., "Power-SLAM: A Linear-Complexity, Consistent Algorithm for SLAM", Conference on Intelligent Robots and Systems, Oct. 29, 2007, pp. 636-643, Publisher: IEEE/RSJ International.

Schreier et al., "Systematic errors in digital image correlation caused by intensity interpolation", Jun. 7, 2000, pp. 2915-2921, Publisher: Society of Photo-Optical Instrumentation Engineers.

Tian et al., "Algorithms for Subpixel Registration", Mar. 27, 1986, pp. 220-233, Publisher: Computer Vision, Graphics, and Image Processing 35.

Zhang et al., "Edge-SIFT: Discriminative Binary Descriptor for Scalable Partial-Duplicate Mobile Search", Jul. 2013, pp. 2889-2902, vol. 22, No. 7, Publisher IEEE Transactions on Image Processing.

Zhou et al., "Determining 3-D Relative Transformations for Any Combination of Range and Bearing Measurements", Apr. 2013, pp. 458-474, vol. 29, No. 2, Publisher: ISS Transactions on Robotics.

* cited by examiner

COMPRESSED EDGE MAP REPRESENTATION FOR IMAGE AIDED NAVIGATION

STATEMENT REGARDING FEDERALLY SPONSORED RESEARCH OR DEVELOPMENT

This invention was made with Government support under Government Contract No. FA8651-16-C-0333 awarded by the Department of the Air Force/AFRL. The Government has certain rights in the invention.

BACKGROUND

In vision-aided navigation, a map may be used to provide absolute position updates. This process works by comparing the image of a scene viewed by a camera to a database of images at known locations. The relative offset between these two images reflects the error in the current navigation state estimate. Maintaining a database of images for navigation requires a great deal of storage, such as tens or hundreds of gigabytes for realistic missions.

One conventional approach to image matching uses edge features or boundaries of objects shown in the images. The edges can be extracted from an image using one of many known edge detection routines, such as the Canny or Sobel methods. After extraction, edges from the camera image and database image can be compared for use in vision-aided navigation as described above. Edges from an image are advantageous to use because they are robust to different sensor bands. For example, edges from an infrared image often match edges from an optical-band image very well.

Most image matching methods store whole imagery for navigation. Although compression, such as JPEG, is often used, this still requires a very large database to cover areas of interest for a mission, requiring the use of an expensive, power-hungry, and unreliable hard drive to store the images.

SUMMARY

A method of generating a map for image aided navigation comprises detecting one or more edges in one or more terrain images, and obtaining a compressed edge representation of the one or more edges. The compressed edge representation is obtained by a method comprising fitting a geometric form or other mathematical model to the one or more edges, calculating one or more coefficients based on the fitted geometric form or other mathematical model, and storing the one or more coefficients in a database for use in generating the map for image aided navigation.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system for compressed edge map representation is provided for use in image aided navigation. The present approach provides a compression method for the storage of an image database that is optimized for an edge matching method of image correlation.

The present approach significantly reduces the memory required for a database by providing much greater compression when compared to conventional whole image approaches. In the present method, the edges of an image are represented using geometric forms or other mathematical models. Exemplary geometric forms or mathematical models include line segments; curve segments such as splines, quadratic curves, or cubic curves; higher order polynomials such as fourth or fifth order; or any other mathematical model to which edges of an image can be fit. This approach allows for just the coefficients of the geometric forms or other mathematical model to be stored, significantly reducing memory requirements.

The present approach allows maps of interest to fit in small amounts of flash memory, for example. This enables very low cost, size, weight and power (C-SWAP) systems to benefit from map-based image aided navigation.

Further details of the present method and system are described hereafter with reference to the drawings.

Figure 1:
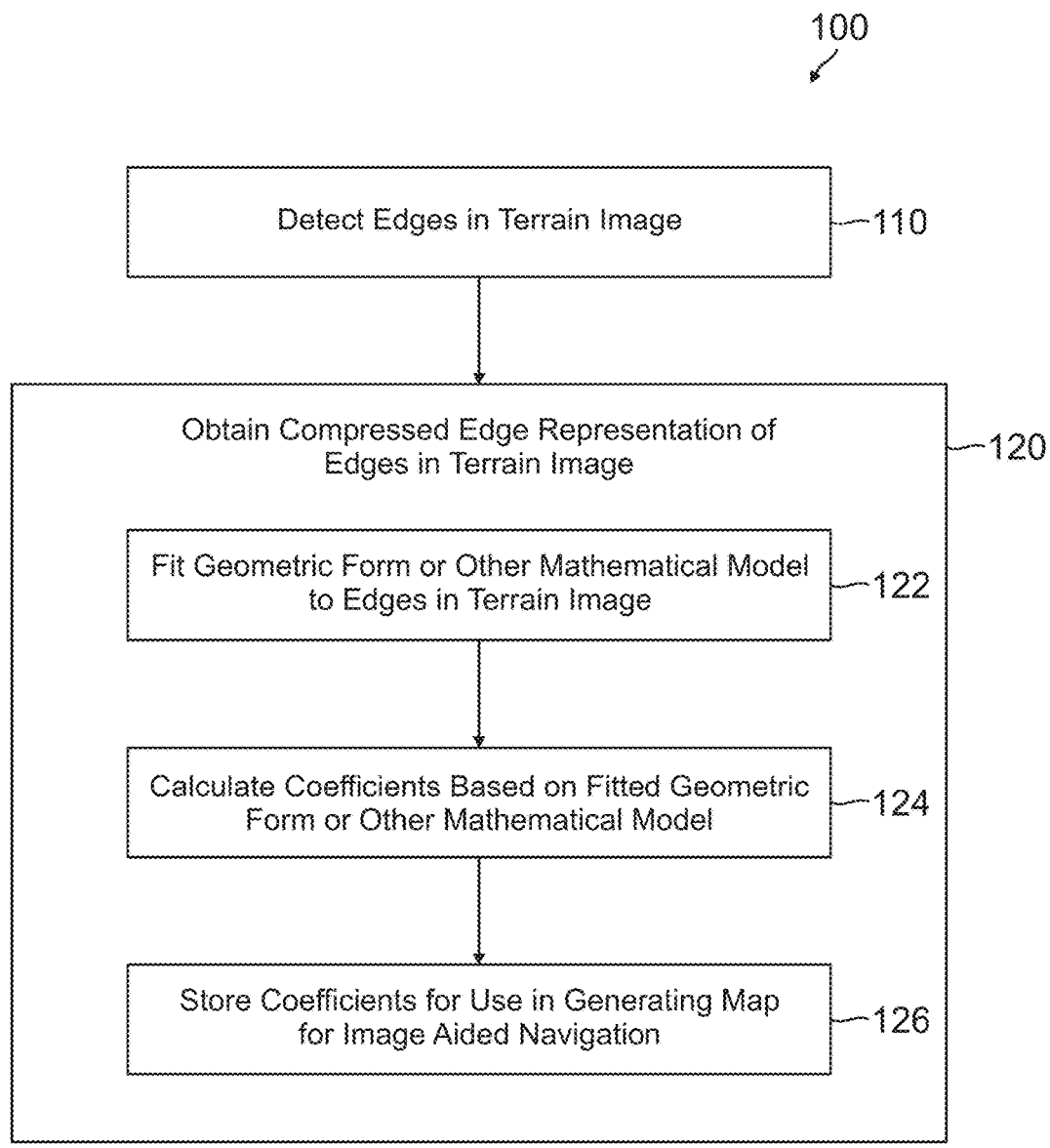
FIG. 1 is a flow diagram of a method for generating a map for image aided navigation, according to one implementation.

FIG. 1 is a flow diagram of a method 100 for generating a map for image aided navigation according to one implementation. The method 100 comprises detecting one or more edges in a terrain image (block 110). The method 100 then obtains a compressed edge representation of the one or more edges in the terrain image (block 120). A means for obtaining the compressed edge representation includes an algorithmic technique that fits a geometric form or other mathematical model to the one or more edges in the terrain image (block 122), and calculates one or more coefficients based on the fitted geometric form or other mathematical model (block 124). The one or more coefficients are then stored for use in generating the map for image aided navigation (block 126).

In one example method, line segments are used to represent the edges of an image. Initially, the image is divided into pixel blocks of a uniform size, such as 8×8 pixel blocks. Then, for each pixel block, one or multiple line segments are fitted to the edge pixels inside the pixel block. This can be accomplished using any number of standard fitting routines, such as a least squares method or singular value decomposition. Lastly, the coordinates of the line segment endpoints are stored. This allows a very large compression of an image database for use in edge-based vision navigation.

In one example implementation, an edge detector such as a Canny edge detector can be applied to each image in world imagery, and then a long-edge selection algorithm can be applied, such that only edge pixels that belong to a long edge are retained and stored in a world map. The long edges correspond to topographic features that correlate well, while short edges typically correspond to noise, clutter or textures that vary greatly with season, year and the imager spectrum. In addition, current camera images can also be subjected to an edge detector, have long edges selected, and then the long edges of the stored world map and the current image are correlated during image aided navigation.

The long-edge selection algorithm prunes the detected edges, keeping only those necessary for navigation. This algorithm is robust to noise in terrain data, and has been evaluated on satellite imagery for various types of terrain. In one approach, the algorithm runs a Canny edge detector on a fine resolution image, and then selects the long edges in the image in the following manner. Initially, the edge-pixel image is divided into 8×8 pixel blocks. Then, in each 8×8 pixel block, the pixels that correspond to edge pixels are fit to a line using a least-squares fit. If there are enough edge pixels in that 8×8 pixel block and they fit well to a line, then the start and end points of each fitted line segment are saved to memory, while all edge pixels are deleted. This significantly reduces the amount of memory needed to store a world map, as shown in Table 1 discussed hereafter. Correlation of images based on long edges also makes the correlation more robust to image noise.

Figure 2:
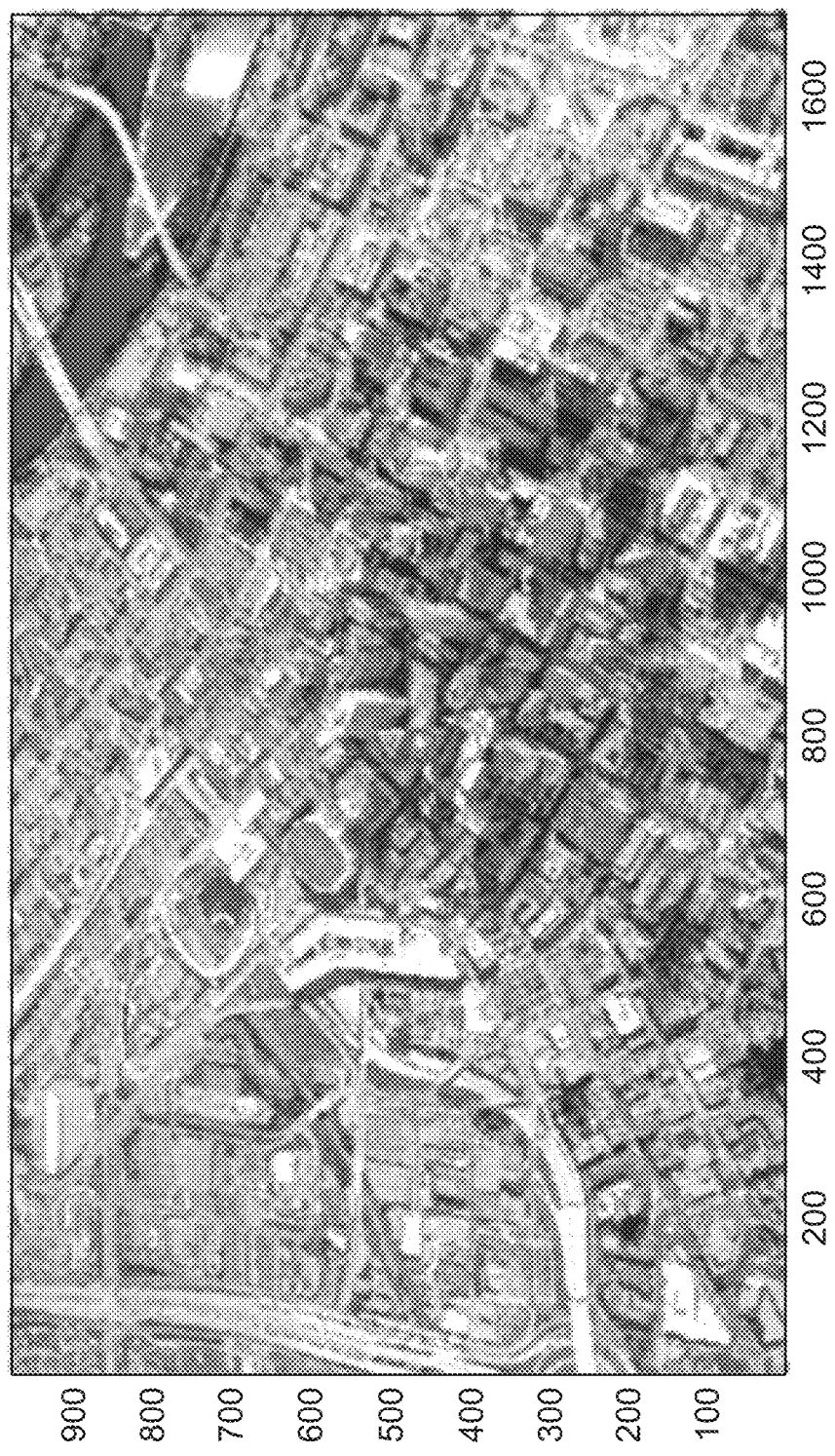
FIG. 2 is an urban terrain type image, which shows line segment edge representations.
Figure 3:
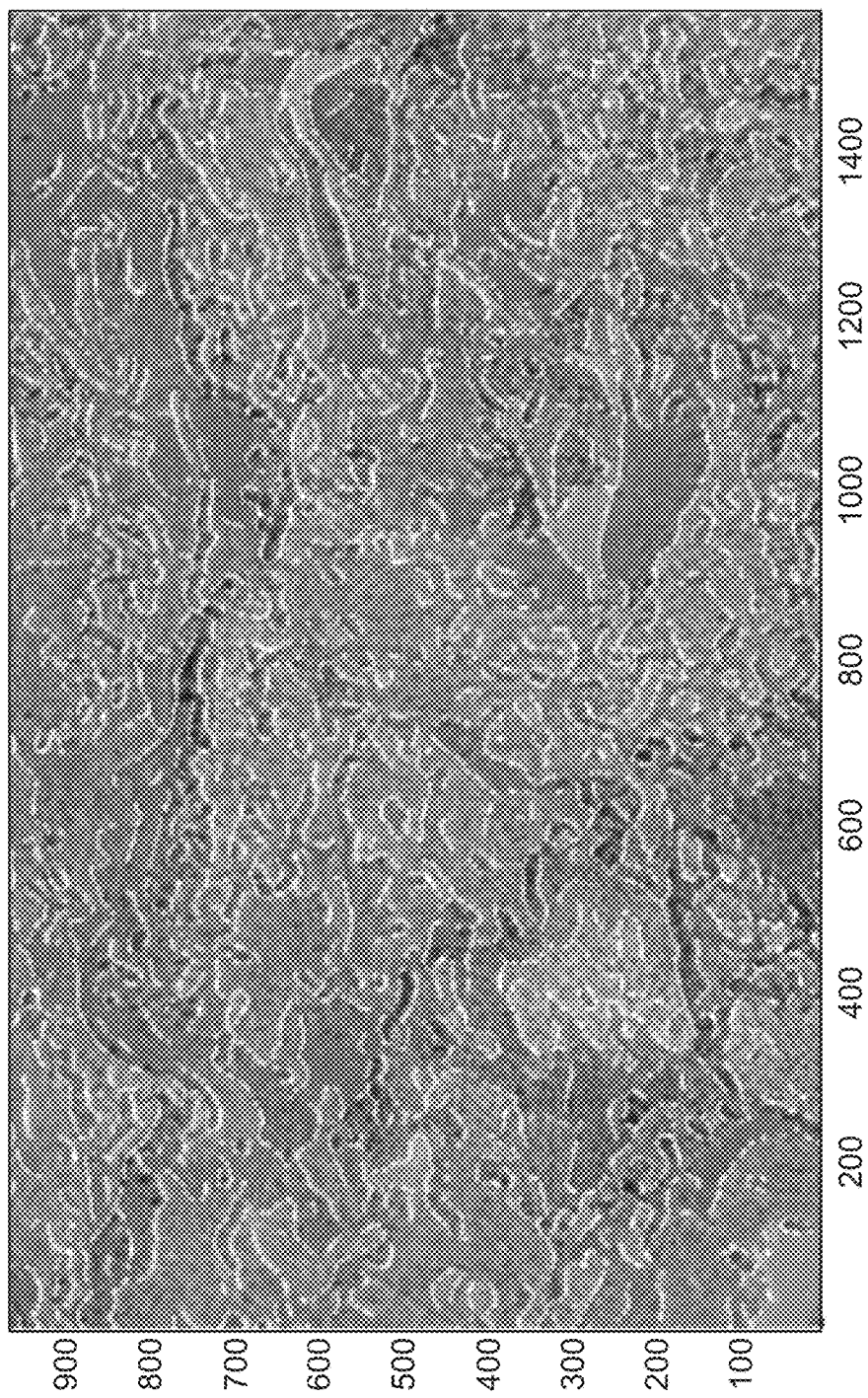
FIG. 3 is a forest terrain type image, which shows line segment edge representations.

In one exemplary test, edge and line segments were evaluated for eight different examples of terrain: urban, suburban 1, suburban 2, rural 1, rural 2, forest 1, forest 2, and desert. FIG. 2 shows an urban terrain type image, for example, with line segment edge representations. FIG. 3 shows a forest terrain type image, for example, with line segment edge representations. As shown in FIG. 2, an urban environment is rich with edge features, such as roads, buildings and other man-made structures that provide ample edges for the algorithm. Even unbroken forest can present an edge rich environment, as shown in FIG. 3.

For most terrain types, a Canny edge detector with a selected blur-size sigma can be used. The selection of blur sigma can be automated in the map building process by monitoring the number of detected edge pixels and adjusting the blur sigma accordingly to achieve a target edge density. When fitting the line to an 8×8 pixel region, only regions with at least 4 edge pixels were used, since a line fits through any 2 points, and at least 4 points are needed to get some statistical significance for the line fit. A threshold was also set on how far the edge pixels could be from the best fit line, in order to consider the line to be good enough to keep. For lines that were good enough, the points (x1, y1) and (x2, y2) where the line intersected the boundaries of the 8×8 pixel region were saved, to represent that line segment. In order to achieve an even higher compression ratio, a second pass over the line segments may be performed to consolidate collinear line segments from different 8×8 pixel regions.

Figure 4:
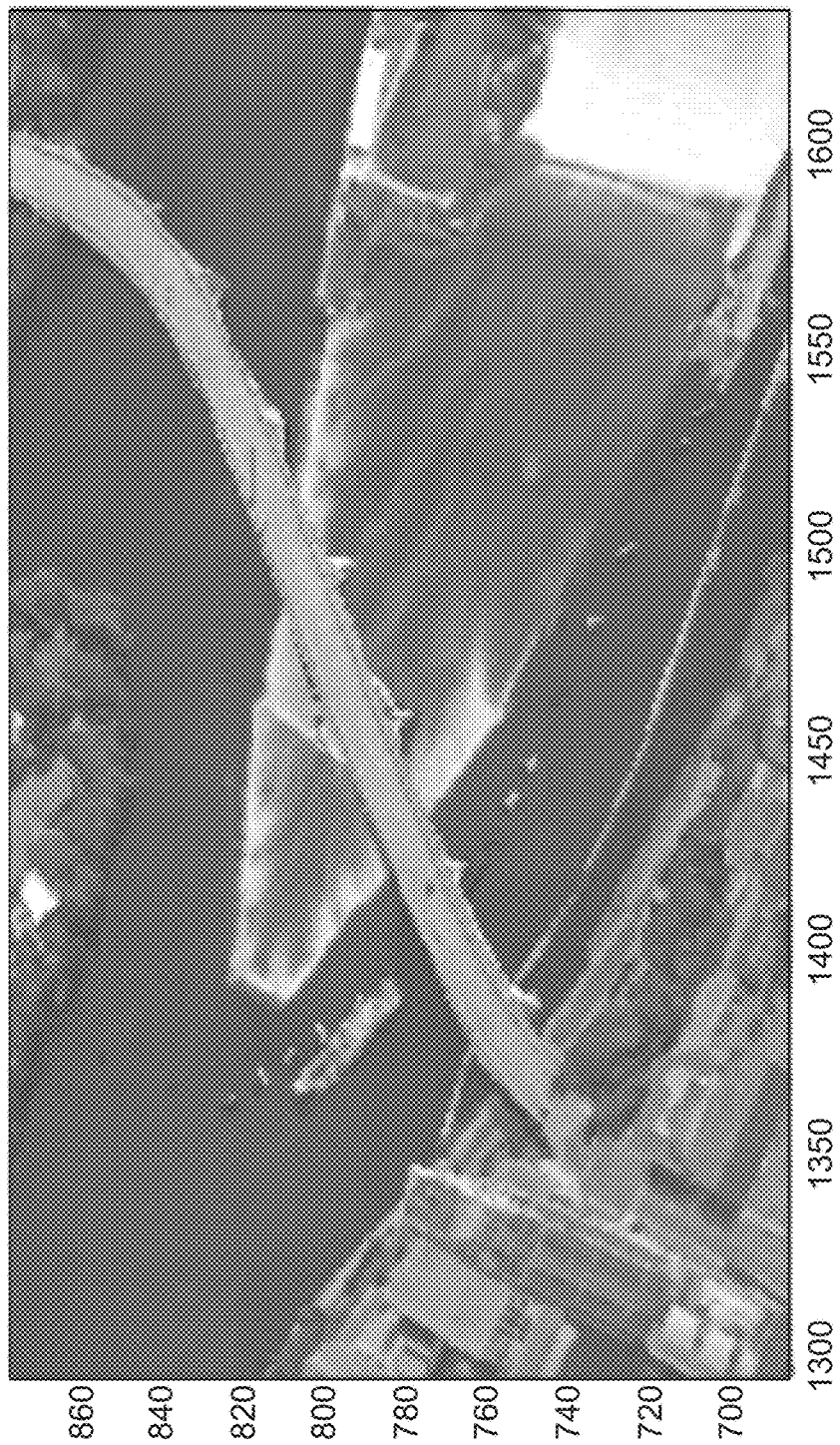
FIG. 4 is a close-up image of a section of the urban terrain type image of FIG. 2.
Figure 5:
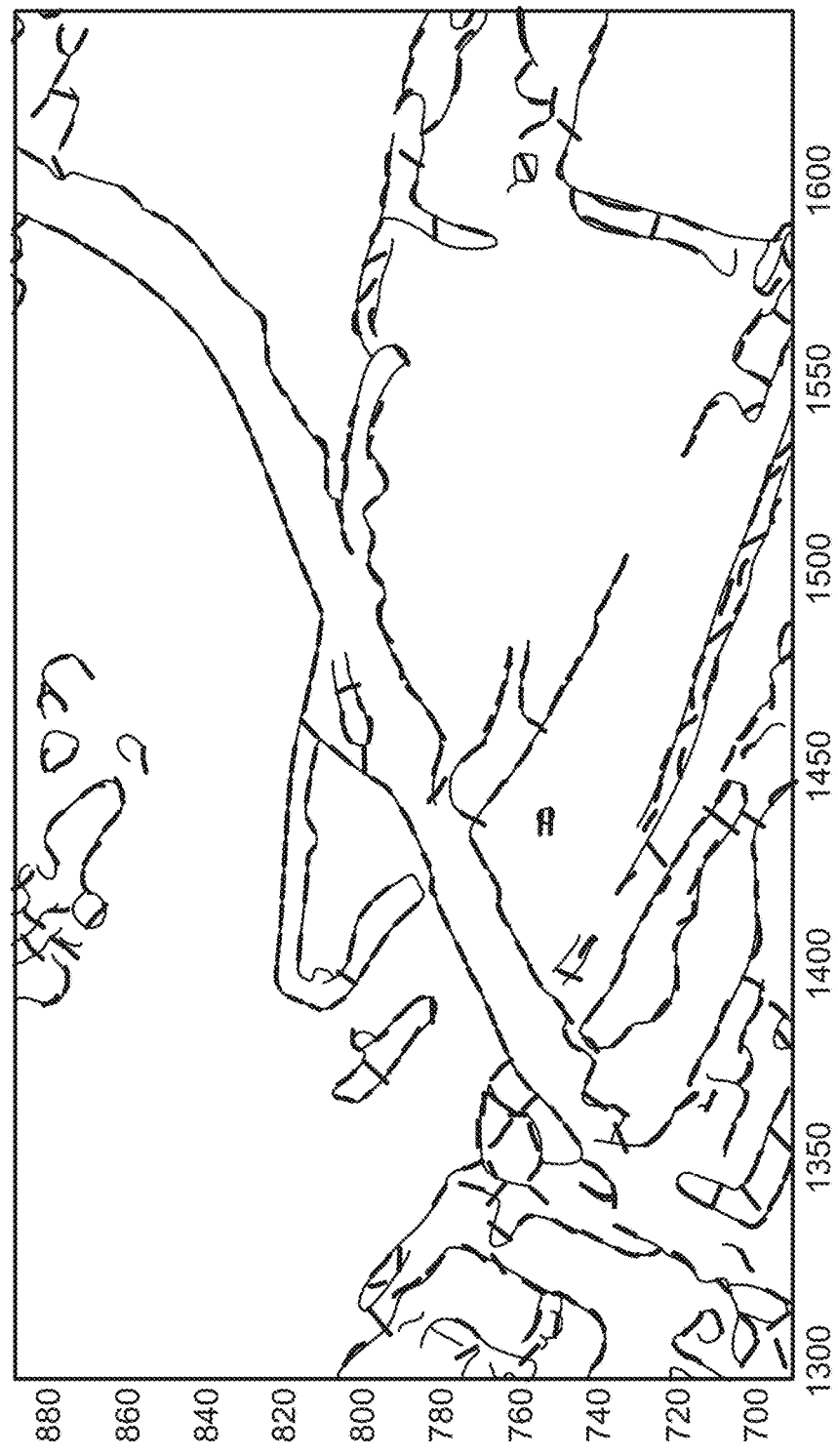
FIG. 5 depicts the extracted edge pixels and line segments from the image of FIG. 4.

FIG. 4 shows a close-up view of the urban terrain type image of FIG. 2. FIG. 5 depicts the extracted edge pixels and line segments from the image of FIG. 4, in which the line segments have been fitted to the edge pixels over the 8×8 pixel blocks.

Figure 6:
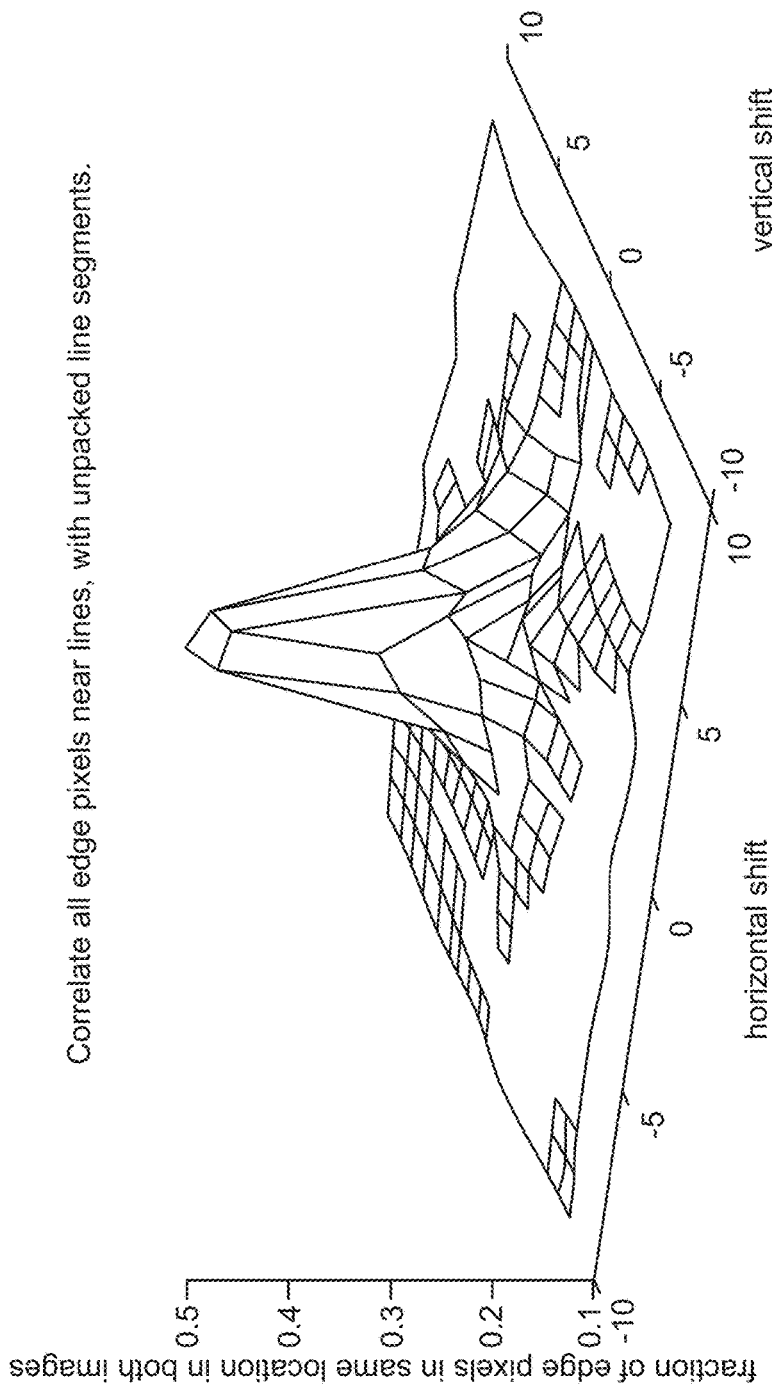
FIG. 6 is a graph of a correlation peak of an edge representation.

FIG. 6 is a graph of a correlation peak of edge representation. The correlation peak is derived from "decompressing" the line segments back into edge pixels and correlating against the original edge pixels. All edge pixels near lines are correlated with unpacked line segments. The strong central peak in the graph of FIG. 6 shows that the decompressed edge representation correlates well with the original edge pixels, indicating that little information is lost in the compression process.

In this example, different terrain types were used to get a representative sample of the various types of terrain that might be encountered on a mission. The number of line segments needed to represent a 1 megapixel map of each of these various terrain types varied greatly, from 1,151 line segments in a region with just a few field edges (Rural 2), to 15,357 line segments in a city with many building edges (Urban). However, the fraction of Earth's surface covered by cities is so small that cities do not dominate the total line-segment count for a world map. Table 1 shows the number of image pixels, number of edge pixels, number of line segments, and number of edge pixels after the line segments are unpacked back into pixels for correlation, for various terrain types.

TABLE 1

|  | Urban | Suburban1 | Suburban2 | Rural 1 | Rural 2 | Forest 1 | Forest 2 | Desert |
| --- | --- | --- | --- | --- | --- | --- | --- | --- |
| Image Pixels | 1,640,268 | 1,632,514 | 595,023 | 1,563,547 | 482,864 | 1,501,440 | 1,642,767 | 1,419,840 |
| Edge pixels | 180,992 | 142,218 | 38,712 | 23,863 | 15,444 | 64,686 | 64,251 | 50,502 |
| Line segments | 15,357 | 12,662 | 3,209 | 2,084 | 1,151 | 6,226 | 6,253 | 4,800 |
| Unpacked pixels | 77,982 | 61,831 | 15,247 | 10,100 | 5,269 | 29,300 | 29,381 | 21,560 |

Comparing rows 1 and 3 of Table 1 shows that there are 0.5 percent as many line segments as pixels. Thus, a 10 meter by 10 meter resolution on Earth's 29 percent land mass, requires $0.29*(4*pi)*(6,370,000 \text{ m}/10 \text{ m})^2 = 1.5e12$ pixels, or equivalently, $1.5e12*0.005 = 7.5e9$ line segments. Since four numbers are needed to store the two coordinates of the start and end points, and those numbers require 2 bytes each, the memory requirements are: (8 bytes/line segment) *(7.5e9 line segments)=60 GigaBytes (GB). If the map is stored for two different seasons, then a total of 120 GB are needed. This would fit into 128 GB flash memory chips, which are available as inexpensive, COTS components.

Figure 7:
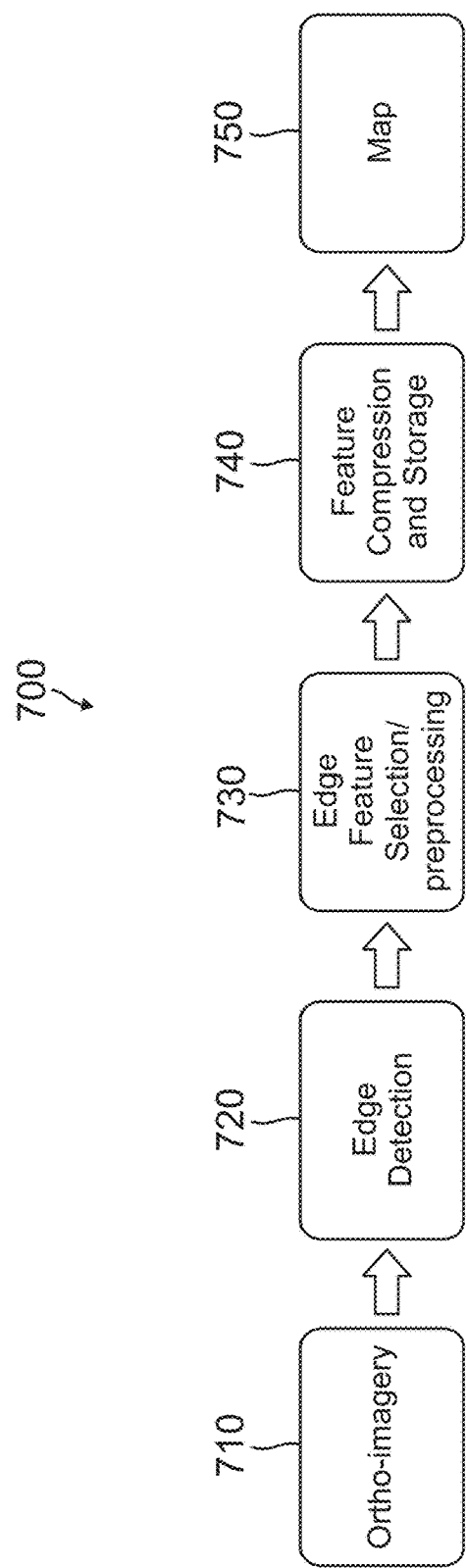
FIG. 7 is a flow diagram of a process for producing a world map for image aided navigation, according to one implementation.

The present compressed edge map representation technique can implemented as part of a world map building process that offers absolute positioning, computational efficiency, sensor agnostic operation, and a massive compression of data, enabling whole-world map representations to be stored on every platform. FIG. 7 illustrates a process 700 for producing and storing a world map according to the present approach.

Initially, the input to the map-making process is ortho-imagery (block 710), which produces high resolution geometrically-corrected (ortho-rectified) images. Like a true map, such images are free of deformation from camera angle, lens distortion, or topographic relief. These images are readily available for the continental United States from the United States Geological Survey (USGS), and for other parts of the world from various other government agencies. Commercial software is also available to produce ortho-imagery from conventional aerial or satellite photographs.

In a first processing step, edge detection of edges in the imagery is carried out (block 720). There are multiple different methods for edge detection, with the most commonly used being the Canny edge detector. Edge feature selection and pre-processing of the edges for use in the map is the next step (block 730).

The next step is feature compression and storage (block 740). In images which have relatively few edges, storing only a list of the locations of the edge pixels may be sufficient. For images that are dominated by a few long edges (the ideal situation for correlation), the edges can be stored extremely efficiently using mathematical models. Because correlation techniques are very robust to variation in a portion of the image, issues regarding staleness of the database are minimized. The feature compression and storage allows whole-world map representations to be easily stored (block 750), such as on a platform that employs image aided navigation.

The process of navigating against the compressed whole-world map representations employs feature decompression of the relevant portion of the map. As map portions are locally indexed, it is unnecessary to decompress the entire map. This decompression stage is the inverse operation of the compression method applied during the generation of the map, returning the applicable portion of the map to a binary pixel image representation of edges. Further processing is then performed for the image aided navigation.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present method can be implemented by computer executable instructions, such as program modules or components, which are executed by a processing means such as at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures. Such a computer readable medium can be any available media that can be accessed by a processing means such as a general purpose or special purpose computer or processor, or any programmable logic device.

Suitable processor-readable media may include storage or memory media such as magnetic or optical media. For example, storage or memory media may include conventional hard disks, compact disks, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes a method of generating a map for image aided navigation, the method comprising: detecting one or more edges in one or more terrain images; and obtaining a compressed edge representation of the one or more edges, the compressed edge representation obtained by a method comprising: fitting a geometric form or other mathematical model to the one or more edges; calculating one or more coefficients based on the fitted geometric form or other mathematical model; and storing the one or more coefficients in a database for use in generating the map for image aided navigation.

Example 2 includes the method of Example 1, wherein the one or more edges in the terrain image are detected with a Canny edge detector.

Example 3 includes the method of any of Examples 1-2, wherein fitting the geometric form or other mathematical model to the one or more edges comprises fitting one or more line segments to the one or more edges.

Example 4 includes the method of Example 3, wherein fitting the one or more line segments to the one or more edges comprises: dividing the one or more terrain images into multiple pixel blocks of a uniform size; and fitting the one or more line segments to edge pixels inside of each pixel block.

Example 5 includes the method of Example 4, wherein fitting the one or more line segments to the edge pixels inside of each pixel block is carried out using a routine comprising a least-squares fit technique or a singular value decomposition.

Example 6 includes the method of Example 4, wherein calculating the one or more coefficients comprises determining coordinates of endpoints for the one or more line segments.

Example 7 includes the method of Example 6, wherein storing the one or more coefficients comprises storing the coordinates of the endpoints for the one or more line segments.

Example 8 includes the method of any of Examples 1-2, wherein fitting the geometric form or other mathematical model to the one or more edges comprises fitting one or more curve segments to the one or more edges.

Example 9 includes the method of Example 8, wherein the one or more curve segments comprise one or more splines, one or more quadratic curves, or one or more cubic curves.

Example 10 includes the method of any of Examples 1-2, wherein fitting the geometric form or other mathematical model to the one or more edges comprises fitting one or more higher order polynomials to the one or more edges.

Example 11 includes the method of any of Examples 1-10, wherein the map for image aided navigation comprises a world map.

Example 12 includes a system for generating a map for image aided navigation, the system comprising: at least one processor; and a memory unit in operative communication with the at least one processor and including a database, the memory unit comprising a non-transitory computer readable medium having instructions executable by the at least one processor to perform a method comprising: detecting one or more edges in one or more terrain images; and obtaining a compressed edge representation of the one or more edges, the compressed edge representation obtained by a method comprising: fitting a geometric form or other mathematical model to the one or more edges; calculating one or more coefficients based on the fitted geometric form or other mathematical model; and storing the one or more coefficients in the database for use in generating the map for image aided navigation.

Example 13 includes the system of Example 12, wherein the one or more edges in the terrain image are detected with a Canny edge detector.

Example 14 includes the system of any of Examples 12-13, wherein fitting the geometric form or other mathematical model to the one or more edges comprises fitting one or more line segments to the one or more edges.

Example 15 includes the system of Example 14, wherein calculating the one or more coefficients comprises determining coordinates of endpoints for the one or more line segments.

Example 16 includes the system of Example 15, wherein storing the one or more coefficients comprises storing the coordinates of the endpoints for the one or more line segments Example 17 includes the system of any of Examples 12-13, wherein fitting the geometric form or other mathematical model to the one or more edges comprises fitting one or more curve segments to the one or more edges.

Example 18 includes the system of any of Examples 12-13, wherein fitting the geometric form or other mathematical model to the one or more edges comprises fitting one or more higher order polynomials to the one or more edges.

Example 19 includes a computer implemented system for generating a map for image aided navigation, the computer implemented system comprising: an edge detector configured to identify multiple edges in each of a plurality of terrain images; and means for obtaining a compressed edge representation of the edges in the terrain images, wherein the means for obtaining the compressed edge representation is configured to: fit a geometric form or other mathematical model to the edges; calculate coefficients based on the fitted geometric form or other mathematical model; and store the coefficients in a database for use in generating the map for image aided navigation.

Example 20 includes the computer implemented system of Example 19, wherein: the geometric form or other mathematical model comprises a plurality of line segments; and the coefficients stored in the database comprise coordinates of endpoints for the line segments.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method of generating a map for image aided navigation, the method comprising:
   detecting one or more edges in one or more terrain images; and
   obtaining a compressed edge representation of the one or more edges, the compressed edge representation obtained by a method comprising:
   fitting a geometric form or other mathematical model to the one or more edges;
   calculating one or more coefficients based on the fitted geometric form or other mathematical model; and
   storing the one or more coefficients in a database for use in generating the map for image aided navigation;
   wherein fitting the geometric form or other mathematical model to the one or more edges comprises fitting one or more line segments to the one or more edges, wherein fitting the one or more line segments to the one or more edges comprises:
   dividing the one or more terrain images into multiple pixel blocks of a uniform size; and
   fitting the one or more line segments to edge pixels inside of each pixel block.

2. The method of claim 1, wherein the one or more edges in the one or more terrain images are detected with a Canny edge detector.

3. The method of claim 1, wherein fitting the one or more line segments to the edge pixels inside of each pixel block is carried out using a routine comprising a least-squares fit technique or a singular value decomposition.

4. The method of claim 1, wherein calculating the one or more coefficients comprises determining coordinates of endpoints for the one or more line segments.

5. The method of claim 4, wherein storing the one or more coefficients comprises storing the coordinates of the endpoints for the one or more line segments.

6. The method of claim 1, wherein the map for image aided navigation comprises a world map.

7. The method of claim 6, wherein portions of the world map are locally indexed.

8. The method of claim 7, wherein during image aided navigation, the method further comprises decompressing one or more relevant portions of the world map to generate a binary pixel image representation of the one or more edges.

9. A system for generating a map for image aided navigation, the system comprising:
   at least one processor; and
   a memory unit in operative communication with the at least one processor and including a database, the memory unit comprising a non-transitory computer readable medium having instructions executable by the at least one processor to perform a method comprising:
   detecting one or more edges in one or more terrain images; and
   obtaining a compressed edge representation of the one or more edges, the compressed edge representation obtained by a method comprising:
   fitting a geometric form or other mathematical model to the one or more edges;
   calculating one or more coefficients based on the fitted geometric form or other mathematical model; and
   storing the one or more coefficients in the database for use in generating the map for image aided navigation;
   wherein fitting the geometric form or other mathematical model to the one or more edges comprises fitting one or more line segments to the one or more edges, wherein fitting the one or more line segments to the one or more edges comprises:
   dividing the one or more terrain images into multiple pixel blocks of a uniform size; and fitting the one or more line segments to edge pixels inside of each pixel block.

10. The system of claim 9, wherein the one or more edges in the one or more terrain images are detected with a Canny edge detector.

11. The system of claim 9, wherein calculating the one or more coefficients comprises determining coordinates of endpoints for the one or more line segments.

12. The system of claim 11, wherein storing the one or more coefficients comprises storing the coordinates of the endpoints for the one or more line segments.

13. A computer implemented system for generating a map for image aided navigation, the computer implemented system comprising:
   an edge detector configured to identify multiple edges in each of a plurality of terrain images; and
   means for obtaining a compressed edge representation of the edges in the terrain images, wherein the means for obtaining the compressed edge representation is configured to:
      fit a geometric form or other mathematical model to the edges;
      calculate coefficients based on the fitted geometric form or other mathematical model; and
      store the coefficients in a database for use in generating the map for image aided navigation;
   wherein the fit of the geometric form or other mathematical model to the edges comprises a fit of a plurality of line segments to the edges, wherein the fit of the plurality of line segments to the edges comprises:
      divide the terrain images into multiple pixel blocks of a uniform size; and
      fit the plurality of line segments to edge pixels inside of each pixel block.

14. The computer implemented system of claim 13, wherein:
   the coefficients stored in the database comprise coordinates of endpoints for the plurality of line segments.

* * * * *